United States Patent
Streiff et al.

(10) Patent No.: US 10,647,922 B2
(45) Date of Patent: May 12, 2020

(54) USE OF A CATALYST COMPOSITION FOR THE CATALYTIC DEPOLYMERIZATION OF PLASTICS WASTE

(71) Applicant: SOLVAY SA, Brussels (BE)

(72) Inventors: Stéphane Streiff, Shanghai (CN); Marco Piccinini, Brussels (BE); Avelino Corma, Valencia (ES); Miriam Cerro-Alarcón, Valencia (ES); Jesús Mengual, Carcaixent (ES)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 16/062,723

(22) PCT Filed: Dec. 15, 2016

(86) PCT No.: PCT/EP2016/081307
§ 371 (c)(1),
(2) Date: Jun. 15, 2018

(87) PCT Pub. No.: WO2017/103018
PCT Pub. Date: Jun. 22, 2017

(65) Prior Publication Data
US 2018/0371326 A1 Dec. 27, 2018

(30) Foreign Application Priority Data
Dec. 18, 2015 (EP) .................................. 15201146

(51) Int. Cl.
C10G 1/10 (2006.01)
C08J 11/16 (2006.01)
C10G 1/08 (2006.01)

(52) U.S. Cl.
CPC .............. C10G 1/10 (2013.01); C08J 11/16 (2013.01); C10G 1/086 (2013.01); C08J 2323/02 (2013.01); C08J 2323/06 (2013.01); C08J 2323/10 (2013.01); C08J 2323/12 (2013.01); C10G 2400/02 (2013.01); C10G 2400/04 (2013.01); Y02W 30/705 (2015.05)

(58) Field of Classification Search
None
See application file for complete search history.

(56) References Cited

U.S. PATENT DOCUMENTS

| | | | | |
|---|---|---|---|---|
| 5,504,259 A * | 4/1996 | Diebold | ................. | C10B 49/12 568/697 |
| 5,700,751 A | 12/1997 | Yang | | |
| 2002/0156332 A1 | 10/2002 | Jiang | | |
| 2012/0310023 A1 * | 12/2012 | Huang | .................. | C10G 1/002 585/241 |
| 2014/0007493 A1 * | 1/2014 | Henry | ...................... | B01J 29/40 44/307 |
| 2014/0228204 A1 * | 8/2014 | Narayanaswamy | ..... | C10G 1/10 502/61 |
| 2015/0158018 A1 * | 6/2015 | Zhan | ...................... | B01J 29/166 208/96 |
| 2015/0159095 A1 * | 6/2015 | Zhan | ...................... | C10G 47/20 208/95 |
| 2015/0166899 A1 * | 6/2015 | Shi | ......................... | B01J 29/072 585/24 |
| 2016/0008796 A1 * | 1/2016 | Saka | ...................... | B01J 29/084 502/68 |
| 2016/0160127 A1 * | 6/2016 | Norena Franco | ........ | C08J 11/16 585/241 |

FOREIGN PATENT DOCUMENTS

| | | |
|---|---|---|
| CA | 2918871 A1 | 1/2015 |
| CN | 102744101 A | 10/2012 |
| EP | 863197 A1 | 9/1998 |
| JP | H08253773 A | 10/1996 |
| JP | 2001107058 A | 4/2001 |
| WO | 0066656 A1 | 11/2000 |
| WO | 2005094990 A1 | 10/2005 |
| WO | 2014125344 A1 | 8/2014 |
| WO | 2017/103012 A1 | 6/2017 |

* cited by examiner

*Primary Examiner* — Ali Z Fadhel

(57) ABSTRACT

Use of a catalyst composition comprising A) a first component containing oxidic compounds comprising aluminum and silicon with a molar ratio of silicon to aluminum of more than 1) B) a second component containing an oxidic compound of silicon wherein the ratio of the number of acidic sites of component A, determined by temperature programmed desorption with ammonia as a base, to the number of acidic sites of component B, determined under the same conditions, is at least 3: in a process for the catalytic depolymerization of plastics waste.

16 Claims, No Drawings

USE OF A CATALYST COMPOSITION FOR THE CATALYTIC DEPOLYMERIZATION OF PLASTICS WASTE

This application is a U.S. national stage entry under 35 U.S.C. § 371 of International Application No. PCT/EP2016/081307 filed Dec. 15, 2016, which claims priority to European application No. 15201146.6—filed on Dec. 18, 2015. The entire contents of these applications are explicitly incorporated herein by this reference.

This application claims priority to European application No. 15201146.6—filed on Dec. 18, 2015—, the whole content of this application being incorporated herein by reference for all purposes.

The present invention relates the use of a catalyst composition for the catalytic depolymerization of plastics waste.

With the rapid development of the polymer industry in the last decades, plastics have become more and more an indispensable part of our daily life and find use in a virtually unlimited number of different applications.

As a consequence thereof, significant amount of plastic waste is produced leading to problems once the plastics have come to the end of their useful life.

Most of the plastic materials do not or only very slowly degrade or decompose on the natural conditions which constitutes an environmental issue gaining increasing importance.

In view of this there have been research and development efforts targeting to the recycling or otherwise acceptable disposition of the plastics waste.

Recycling of plastics waste into other useful plastic products is mainly limited to thermoplastic materials and the recycled product is usually of poorer quality so that recycling is not an efficient way to handle all the plastics waste.

Incineration of the plastics waste may produce toxic gases due to ingredients and additives in the plastics or arising from the plastic material itself if same contains e.g. chlorine or other components which may lead to toxic or corrosive gases upon heating.

The so called tertiary or chemical recycling, in which the plastics materials are converted through catalytic or thermal cracking is expected to become more and more important, since these technologies permit the treatment of mixtures of different types of plastics, thereby avoiding the upstream separation of the different plastic materials.

Thermal or catalytic depolymerization of plastic waste has therefore been investigated increasingly in the recent past.

WO 00/66656 relates to a process for obtaining hydrocarbons from plastic wastes by direct catalytic cracking which comprises heating the plastic wastes until melted plastics are obtained, contacting the melted plastic with a catalyst and removing the cracking products from the system. The catalyst is selected among the group comprised of fresh fluid catalytic cracking (FCC) catalysts, FCC equilibrium catalysts and mixtures thereof.

U.S. Pat. No. 5,700,751 is related to a catalyst used for treating waste plastics, which comprises a carrier and an active component. In accordance with claim 2, the carrier and the catalyst is silica.

EP 863,197 is directed to a process for producing gasoline, diesel and carbon black from waste rubber wherein the waste materials are charged into a pyrolysis device through a feeder (carbon black being discharged from the pyrolysis), charging the resulting materials in gaseous phase into a device for catalytic cracking and thereafter fractionating the resulting products through a column. A number of catalysts suitable for the process are described.

WO 2005/094990 relates to a process for preparing a cracking catalyst comprising mixing faujaiste zeolite, pseudoboehmite alumina, polyammonium silicate, kaolin clay, milling said ingredients and making a slurry using water, spray drying said slurry to micro-spheres and thereafter calcining at 500° C. The catalyst is used for the cracking of plastics waste.

US 2002/156332 discloses a system for the conversion of waste plastics into hydrocarbon oil wherein in a first step the waste is subjected to thermal cracking and in a second step to a catalytic cracking with an acid catalyst.

JP2001107058 describes a method for depolymerization of plastic waste by heating the plastic waste in the presence of a FCC catalyst and sand. The FCC catalyst has $Al_2O_3$ as the main component.

Generally, in the catalytic depolymerization of plastic waste five classes of products are mainly obtained: gases, gasoline fractions, kerosene fractions, diesel fractions and waxes (hereafter also referred as HCO=Heavy Cycled Oil) and all of them can in principle be valorized. Gasoline/diesel and waxes are, however, the most commercially valuable products while gases are the less.

Particularly for gasoline fractions it is important to achieve a high octane number and for diesel fractions it is important to have a low concentration in polycyclic aromatic hydrocarbons (hereafter also referred to as poly-aromatics) to meet the specifications for diesel fuel set by EN 590: 2009+A1 (version of February 2010).

In particular it is difficult to obtain a product spectrum in a single catalytic reaction with a catalyst system wherein the different fractions meet all the requirements set forth above, i.e. high octane number for gasoline while at the same time keeping the content of poly-aromatics below the upper limit allowed by EN 590, namely 8%.

It was thus an object of the present invention to provide a catalyst composition suitable for use in the catalytic depolymerization of plastic waste, which yields a product mixture comprising high amounts of gasoline and diesel with high quality and low amounts of gas while keeping a high conversion as function of reaction time.

This object has been achieved with the use of a catalyst composition as defined in claim 1.

Preferred embodiments of the present invention are set forth in the dependent claims and the subsequent detailed specification hereinafter.

In accordance with the present invention, a catalytic composition comprising as component A) a composition containing oxidic compounds comprising aluminum and silicon with a molar ratio of silicon to aluminum of more than 1, preferably of more than 1.5:1 and particularly preferably more than 2:1 and as component B) an oxidic compound of silicon, wherein the ratio of the number of acidic sites of component A, determined by temperature programmed desorption with ammonia as a base, to the number of acidic sites of component B, determined under the same conditions, is at least 3:1, is used in a process for the catalytic depolymerization of plastics waste.

The fluid cracking catalyst (hereinafter referred to as FCC catalyst) used as component A) may be a fresh fluid catalytic cracking (FCC) catalyst, a FCC equilibrium catalyst or mixtures thereof.

Fluid cracking catalysts (hereinafter referred to as FCC catalysts) are preferred components A of the catalytic compositions in accordance with the present invention. These FCC catalysts may be fresh FCC catalysts, FCC equilibrium catalysts or mixtures thereof. FCC catalysts comprising supported or unsupported zeolites are particularly preferred as component A.

Many analytic techniques can be used for the quantitative determination of silicon and aluminum. As an example, such determination can be achieved through X-ray fluorescence analysis. X-ray fluorescence (XRF) is the emission of characteristic "secondary" (or fluorescent) X-rays from a material that has been excited by bombarding with high-energy X-rays or gamma rays. This method is widely used for elemental analysis and chemical analysis, particularly in the investigation of metals and the skilled person is aware of respective methods and the equipment necessary.

When materials are exposed to short-wavelength X-rays or to gamma rays, ionization of their component atoms may take place. Ionization consists of the ejection of one or more electrons from the atom, and may occur if the atom is exposed to radiation with an energy greater than its ionization potential. X-rays and gamma rays can be energetic enough to expel tightly held electrons from the inner orbitals of the atom. The removal of an electron in this way makes the electronic structure of the atom unstable, and electrons in higher orbitals "fall" into the lower orbital to fill the hole left behind. In falling, energy is released in the form of a photon, the energy of which is equal to the energy difference of the two orbitals involved. Thus, the material emits radiation, which has energy characteristic of the atoms present. The term fluorescence is applied to phenomena in which the absorption of radiation of a specific energy results in the re-emission of radiation of a different energy.

Each element has electronic orbitals of characteristic energy. Following removal of an inner electron by an energetic photon provided by a primary radiation source, an electron from an outer shell drops into its place. There are a limited number of ways in which this can happen. The main transitions are given names: an L→K transition is traditionally called $K_\alpha$, an M→K transition is called $K_\beta$, an M→L transition is called $L_\alpha$, and so on. Each of these transitions yields a fluorescent photon with a characteristic energy equal to the difference in energy of the initial and final orbital. The wavelength of this fluorescent radiation can be calculated from Planck's Law:

$$\lambda = \frac{hc}{E}$$

The fluorescent radiation can be analysed either by sorting the energies of the photons (energy-dispersive analysis) or by separating the wavelengths of the radiation (wavelength-dispersive analysis). Once sorted, the intensity of each characteristic radiation is directly related to the amount of each element in the material.

The number of acidic groups in component A to the number of acidic groups in component B of the catalytic compositions is at least 3:1, preferably at least 4:1 and particularly preferably at least 6:1.

The number of acidic groups is determined in accordance with the following method by temperature programmed desorption or thermal desorption spectrometry using ammonia. Appr. 100 mg of sample, granulated in the 0.42-0.84 mm range are loaded as a fixed bed in a U-type Quartz reactor. The sample is pretreated at 450° C. for 1 h under Ar to eliminate any surface contamination and/or occluded volatile species that could be further desorbed during the measurement. Afterwards, a flow of ammonia is allowed by the means of a pulse system and using He as a carrier gas. Ammonia is chemisorbed over the solid sample at 100° C. until equilibrium is reached i.e. until the concentration of irreversibly chemisorbed ammonia at a fixed temperature is constant. Thereafter 100 ml/min of He are allowed inside the reactor and the temperature is progressively increased up to 900° C. at 10° C./min. Desorption of the ammonia is monitored by means of a thermal conductivity detector and mass spectrometer. Both adsorbed and desorbed volume are measured under pressure and temperature standard conditions.

In some cases it has proven advantageous if the catalyst composition has a certain minimum amount of Bronsted acid sites, relative to the total acidity, in particular at least 20, preferably at least 25%. In some cases, it has been found that catalyst compositions comprising a maximum amount of 25, preferably 20 and even more preferably 15% of Lewis acidity may be advantageous.

The ratio of Bronsted acidic sites to Lewis acidic sites can be determined by Infrared spectroscopy as the two types of acid groups have a different IR absorption. The ratio of Bronsted to Lewis acidic sites can be determined by the temperature programmed desorption with pyridine e.g. as follows: Wafers of the composition to be analyzed with a thickness of 10 mg/cm² are degassed overnight under a vacuum of 0.01 Pa at 400° C. to eliminate water and organic compounds. Thereafter the wafer is exposed to pyridine vapor of 1866 Pa at room temperature. After equilibration, the sample is degassed for 1 h at increasing temperatures (150, 250 and 350° C.). FTIR spectra are recorded at room temperature before pyridine adsorption and after desorption at different temperatures. The spectrum gives characteristic peaks for pyridinium ions at Bronsted acid sites and at a lower wavelength for pyridinium ions at Lewis acid sites. Thus, the quantitative evaluation of the IR spectrum can be used to determine the amount of each of Bronsted and Lewis acid sites.

The total acidity of component A (determined by temperature programmed desorption with ammonia as described above) is not subject to particular restrictions (except for the ratio to the number of acidic sites in component B of the compositions). In certain cases amounts of total acidity in the range of from 20 to 800, preferably of form 30 to 700 and particularly preferably of from 50 to 600 µmol/g of component A have proved to provide certain advantages.

Determination of the acidity in FCC catalysts is described in more detail in "Fluid Catalytic Cracking VI: Preparation and Characterization of catalysts (Ed. M. Occelli), Elsevier which compiles 21 scientific papers presented during the 219th National Meeting of the American Chemical Society, pp. 35ff and to which reference is made here for further details.

Zeolites, which are the preferred products for FCC catalysts which are preferred as component A of the catalytic composition are microporous aluminosilicate minerals widely used in fluid catalytic cracking of natural oil in refineries.

A zeolite mineral is a crystalline substance with a structure characterized by a framework of linked tetrahedra, each consisting of four O atoms surrounding a cation. This framework contains open cavities in the form of channels and cages.

Zeolites are based on $TO_4$ tetrahedra where T is usually an aluminum or a silicon atom (or phosphorus in aluminophosphates). The three-dimensional networks of zeolites are the result of all four corners of the tetrahedra being shared, leading to low density microporous materials.

One or more zeolite minerals having a topologically distinctive framework of tetrahedra, and a composition that is distinctive for zeolites having that framework, constitute separate species.

Zeolites having the same topologically distinctive framework of tetrahedra constitute a series when they display a substantial range in composition in which differing extra-framework cations may be the most abundant in atomic proportions.

Zeolites may be generally characterized by the formula

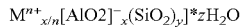

wherein n denotes the charge of metal M and is usually 1 or 2, i.e. M is typically a cation of an alkaline or an alkaline earth metal or hydrogen. The cations serve the purpose of neutralizing the charge of the Al tetragons having a negative charge and are not incorporated in the main crystal lattice but are rather present in the cavities of the lattice. For this reason the metals M are usually mobile in the lattice and may be rather easily exchanged. z is the indication of the number of water molecules which can be adsorbed. Zeolites are capable to reversibly adsorb and desorb water without deterioration of their crystal structure.

The molar ratio y/x in the above formula is often referred to as the modulus and is always greater than or equal to 1.

The following table provides the composition of some synthetic zeolites which are often used in FCC catalysts:

TABLE 1

| Name | Metal | x | y | z |
|---|---|---|---|---|
| Zeolite X | Na | 86 | 106 | 264 |
| Zeolite Y | Na | 56 | 136 | 250 |
| Zeolite L | K | 9 | 27 | 22 |
| Mordenit | Na | 8.7 | 39.3 | 24 |
| ZSM-5 | Na (0.3) H(3.8) | 4.1 | 91.9 | — |
| ZSM-11 | Na(o.1) H(1.7( | 1.8 | 94.2 | — |

Typical FCC catalysts usually comprise zeolite X, REX (where RE denotes rare earth) Y, REY (where RE denotes rare earth), USY (which is the designation of ultrastable zeolite Y obtained by reducing the Al-content of zeolite Y), zeolite L, zeolite ZSM-5 or combinations thereof but other types of zeolite may be present and replace these types.

Preferred crystalline microporous zeolites useful for component A of the catalytic compositions in accordance with the present invention, are ZSM-5, ZSM-11, ZSM-22, ZSM-23, ZSM-35, ZSM-48, ZSM-50, TS-1, TS-2, SSZ-46, MCM-22, MCM-49, FU-9, PSH-3, ITQ-1, EU-1, NU-10, silicalite-1, silicalite-2, boralite C, boralite-D and mixtures thereof.

Preferred FCC catalysts are microporous solids comprising typically approximately 5 to 70 wt % preferably of from 5 to 50 wt % of zeolite in a matrix which consists mainly of or comprises a major part of kaolin clay, alumina or aluminosilicate gel or mixtures thereof.

The pore distribution of the FCC catalyst typically spans a broad range and can cover the whole spectrum from micropores to macropores. Whereas micropores are defined as pores having an average pore diameter of 2 nm or less, mesopores have a respective average pore diameter of exceeding 2 up to 50 nm and macropores have a respective average diameter exceeding 50 nm.

In accordance with a preferred embodiment of the present invention component A of the catalyst composition has a pore size distribution such that at least 20%, preferably at least 20% and even more preferably at least 40%, most preferably at least 50% of the cumulative pore volume is formed by pores having a diameter of 5 nm or more. Concurrently, the catalyst used contains a significant amount of micropores, i.e. pores with a diameter of 2 nm or less. Usually, the pore volume formed by pores with a diameter of 2 nm or less at least 10, more preferably at least 15 and even more preferably at least 20% of the total pore volume. The porosity and pore size distribution of the material can be determined by mercury porosimetry assuming a contact angle of 140° and a surface tension of mercury at 25° C. of 0.485 N/m in the scanning or continuous mode. Suitable equipment is available from Micromeritics and a suitable apparatus from Micromeritics is the Autopore series of instruments In general, determinations of pore diameter, pore size distribution and surface area are made by well known techniques. In particular, such measurements can be done according to ISO standards. For the measurement of surface area (generally called BET surface) ISO-9277 'Determination of the specific surface area of solids by gas adsorption—BET method' can be followed. For the measurement of pore volume and pore distribution in mesoporous materials ISO15901-2 'Pore size distribution and porosity of solid materials by mercury porosimetry and gas adsorption—2: Analysis of mesopores and macropores by gas adsorption' can be followed. For the measurement of pore volume and pore distribution in microporous materials ISO15901-3 'Pore size distribution and porosity of solid materials by mercury porosimetry and gas adsorption—Part 3: Analysis of micropores by gas adsorption' can be followed.

The initial step in a cracking reaction in FCC is the formation of a carbocation. Accordingly, the activity of FCC catalysts is due to the presence of acidic sites and is determined by the zeolite content and by the types of zeolite and matrix in the FCC catalyst. Catalytic activity is determined by the zeolite type, the acidic nature (Bronsted or Lewis), acidic strength, concentration and distribution of the acid sites, the pore size distribution, the matrix surface area and activity and the presence of additives or contaminants. FCC catalysts are designed using these parameters.

Acidity of the FCC catalyst plays an important role and it has also been found in the present invention that the ratio of acidity of component A and component B has an influence on the efficacy and selectivity of the process towards diesel and gasoline fractions of high quality.

The acidic sites of a FCC catalyst are provided by the alumina tetrahedra. The net charge of the alumina tetrahedra is −1 which is balanced by the metal M during the synthesis. The metal may at a later point in time replaced by an ammonium ion which is vaporized when the catalyst is subsequently dried, resulting in the formation of Lewis and Bronsted acidic sites. In some cases the Bronsted sites are later replaced by rare earth metals to provide alternative activity and stability levels (these are the RE types referred to above).

The matrix component of a FCC catalyst usually comprises amorphous alumina and a binder or filler may be present which support to provide the physical strength and integrity of the catalyst. The binder is in many cases a silica sol and the filler is usually based on clay (in many cases kaolin).

Suitable components A are commercially available in many grades and types from various suppliers. The skilled person is aware of the properties of the commercial products available and sold for FCC cracking units and will thus select the appropriate product based on his professional experience and taking into account the information provided above. Major suppliers of FCC catalysts are BASF, Albemarle Corporation, and W.R. Grace, to name only some sources.

As indicated above, the FCC catalyst present as component A may be a fresh FCC catalyst, an equilibrated FCC catalyst (frequently referred to as E-FCC catalyst or ECAT) or a mixture of the two.

Equilibrated FCC catalyst, for the purpose of this invention, denotes a catalyst which has been used in a fluid catalytic cracking unit. Operation of fluid catalytic cracking unit implies the continuous purge of catalyst from the reactor unit in order to remove contaminants that are present in the raw material feedstream and that are deposited onto FCC catalyst during reaction. Example of these contaminants is V. Equilibrium catalysts are used catalysts which have lost part of their catalytic activity and are richer in contaminants than fresh FCC catalyst. For refineries, it is economically unfeasible the reuse of such equilibrium catalyst. They are still well suited however, for use in accordance with the present invention for the catalytic depolymerization of plastics waste.

Equilibrium FCC catalysts are commercially available by a number of suppliers known to the skilled person. Inprocat and Equilibrium Catalyst Inc. may be mentioned here as examples.

Component B in the catalytic composition in accordance with the present invention is an oxidic compound of silicon, preferably silica, having a low surface acidity, i.e. the number of acidic sites is at maximum one third of the number of the acidic sites of component A, i.e. the ratio of the number of acidic sites of component A to the number of acidic sites of component B is at least 3:1, preferably at least 4:1 and even more preferably at least 6:1.

Preferred materials for component B comprise at least 60, preferably at least 70 and even more preferably at least 80 wt % of silica-equivalent of an oxidic compound based of silicon. Most preferably, component B is silica. The content of oxidic compound based of silicon is expressed in silica-equivalent and it is measured as following: the content of elemental silicon (Si) is measured (example of suitable analytic method is ICP-OES: Inductively Coupled Plasma Optical Emission Spectrometry), the Si content is mathematically converted into $SiO_2$ concentration-equivalent:

silica-equivalent content=Si wt % content/atomic weight of Si*molecular weight of $SiO_2$.

The weight ratio of component A and B is not subject to particular limitations. The higher the content of component A the higher the cumulative conversion in a given time under specified conditions.

It has been found in many cases that the addition of ca. 50 of component B suffices to obtain a diesel product fraction which meets the EN 590 specification, whereas pure FCC catalyst or ECAT do not yield a diesel fraction meeting this standard. It is thus preferred to use at least 50%, more preferably at least 55% and most preferably >60% of component B in the mixtures. However, the quality of the diesel fraction is already improved by lower amounts of component B as far as the content of di-, tri- and polycyclic aromatic hydrocarbons is concerned.

In accordance with another embodiment, the present invention also relates to catalytic compositions comprising at least 50 wt % of component B.

The weight ratio of catalyst composition to plastic waste in accordance with the present invention is not subject to particular restrictions. In some applications it has been advantageous if the weight ratio of plastic materials to catalyst composition is in the range of from 100:1 to 1:1, preferably 10:1 to 1:1 but the skilled person will determine the best suitable ratio in accordance with his professional knowledge and based on the specific application case.

The plastics waste that may be subjected to the catalytic depolymerization in accordance with the present invention can be selected from a variety of sources like post consumer waste plastics, off-spec plastics, industrial scrap plastic or the like. More particular, the mixture of thermoplastics includes waste plastics or industrial scrap plastics, in particular substantially consists of waste plastics. By plastic, material substantially consisting of one or more particular polymers, products comprising preferably more than 25% by weight of a particular polymer, more preferably more than 40%, in particular more than 50% by weight of a particular polymer is meant. The polymers are preferably the thermoplastics as defined below.

Substantially comprising or substantially consisting of as used herein means at least 75%, preferably at least 80%, more preferably at least 85%. Percentages given herein are % by weight, based on the total weight of the composition, respectively, if not indicated otherwise.

Preferably, the plastics waste starting material comprises one or more thermoplastic polymers and is essentially free of thermosetting polymers. Essentially free in this regard is intended to denote a content of thermosetting polymers of less than 15, preferably less than 10 and even more preferably less than 5 wt % of the composition.

The thermoplastics used in the process may include mechanically assembled mixed plastic, glued mixed plastic, multilayered film plastic, multilayered plastic objects, composite plastic, etc.

The content of impurities of the mixture of thermoplastics is usually between 0.1 and 5% by weight, in particular in between 1 and 3% by weight. The impurities include organic materials and inorganic materials different than polymers, such as stones, soil, inorganic salts, metal, glass and alike. Examples of organic material are paper, food residues, textiles, wood, etc.

In a preferred embodiment, the mixture of thermoplastics as used in the process of the invention is mostly constituted of polyolefins and styrene polymers, preferably polystyrene (PS). Preferably, the fraction of polyolefin and styrene polymers, preferably polystyrene in the mixture of thermoplastics is at least 50% by weight, more preferably at least 75% by weight, and in particular substantially consists of polyolefin and styrene polymers, preferably polystyrene. Preferably, the mixture of thermoplastics comprises less than 99.5% by weight of polyolefin and polystyrene, more preferably less than 99% by weight. As polyolefines, polypropylene (PP) and polyethylene (PE) are preferred.

Optionally, the mixture of thermoplastics comprises minor amounts of less desirable plastics such as PVC, PVDC, PET, PU, ABS, nylon, or fluorinated polymers, such as Teflon. Preferably, the content of these less desirable plastics in the mixture of thermoplastics is 10% by weight or less. More preferably, the content of the less desirable plastics in the mixture of thermoplastics is lower than 5% by weight, in particular less than 2% by weight.

The plastics waste used as starting material may be subjected to a pre-treatment prior to being subjected to the catalytic depolymerization with the catalytic composition in accordance with the present invention.

Thus, the starting material may by subjected to a process comprising the steps of a) introducing the mixture of thermoplastics in the form of particles into a reactor under reduction of oxygen content of the atmosphere surrounding the particles, b) heating the mixture of thermoplastics in the presence of a solvent to obtain liquefaction of a substantial part of the thermoplastics, c) separating insoluble fractions at the surface of the mixture and/or the bottom of the reactor, and d) recovering liquefacted thermoplastics from the reactor, wherein the process steps a) to c) are preferably conducted in one reactor.

In step a) of such process the mixture of thermoplastic particles is introduced into a reactor in the form of particles. Thermoplastics in the form of particles are known and available, typically from conventional dry treatment including size reduction by grinding or shredding, gravity separation by cycloning or magnetic separation of plastics, such as waste plastics. The particles preferably have an average size in the range of 10-100 mm, more preferably in the range of 10-50 mm. Suitable apparatuses for preparing and obtaining thermoplastics in the form of particles as specified herein are known in the art.

In step b) of the pre-treatment process referred to above, the mixture of thermoplastics is heated in the presence of a suitable solvent to achieve liquefaction of substantial part of the thermoplastics. Substantial part means preferably at least 50% by weight, more preferably at least 80% by weight, in particular at least 90% by weight, e.g. at least 99% by weight, based on the total content of thermoplastics. Heating can be conducted by any means known in the art. For instance, heating can be conducted by direct or indirect contact with a heater transfer medium, by mechanical friction, by induction, by radiation, or electrical power. Preferably, heating is conducted by direct or indirect contact with a heat transfer medium, in particular by indirect contact. Examples of indirect contact with heat transfer medium, is in an agitated closed vessel, screw auger, etc. Suitable heat transfer media are hot inert gas, steam or heat transfer oils.

The mixture of thermoplastics is heated in step b) of the pre-treatment process in the presence of a suitable solvent. Preferably, the solvent is a compound or mixture of compounds which are substantially liquid during step b) e.g. before, during and/or after heating to the final temperature in step b). Before heating, e.g. at room temperature (20° C.) the solvent may be substantially liquid or substantially solid. Typical solvents are hydrocarbons, e.g. oil, bio diesel or hydrocarbon cuts and mixtures thereof, which are known and available. Hydrocarbon cut is preferred. Hydrocarbon cut is a mixture of hydrocarbons and is e.g. available from pyrolysis of plastics. Gasoline cut available from pyrolysis of plastics is particular preferred. In a preferred embodiment the solvent used in step b) is an aliphatic hydrocarbon, preferably having a boiling point of between 50° C. and 150° C. (at standard conditions, 1 atm). Most preferred, an aliphatic hydrocarbon, or a mixture thereof, having a boiling point between 50° C. and 150° C. is used, such as one or more $C_6$ to $C_8$ aliphatic hydrocarbons, in particular $C_6$ to $C_8$ alkanes.

In step c) of the pre-treatment process insoluble fractions are separated. Insoluble fractions both comprise gaseous impurities, which are present or are formed during heating step b), as well as insoluble solids or liquids. Insoluble fractions may be removed from the bottom of the reactor, preferably by continuous extraction, e.g. via a screw device. Insoluble fractions which are solid or liquid and are lighter than the liquefacted thermoplastics can be removed from the surface of the mixture, which removal preferably is conducted continuously.

With such a pre-treatment the valuable plastic is separated from a mixture of thermoplastics, which may comprise an amount of impurities, as a melt, possibly diluted by a suitable solvent, such as a hydrocarbon cuts, while separating insoluble fractions, such as gaseous impurities, water and solid impurities by decantation and flotation of insoluble material. By using such a pre-treatment process, a mixture of thermoplastics, such as a crude plastics or waste plastics, is rendered particularly useful for the cracking (thermal depolymerization) process.

A third embodiment of the present invention relates to a process for the catalytic depolymerization of plastic waste wherein a) in a first step plastics waste is introduced into a reactor and melted and thereafter the temperature is increased to a temperature in the range of from 350 to 600° C., b) thereafter a catalytic composition comprising as component A) a composition containing oxidic compounds comprising aluminum and silicon with a molar ratio of silicon to aluminum of more than 1, preferably a fluid catalytic cracking (FCC) catalyst and as component B) a compound based on oxidic compounds of silicon, wherein the ratio of the number of acidic sites of component A to the number of acidic sites of component B is at least 3:1, is added to the molten plastics, c) the catalytic depolymerization is carried out at a temperature of from 350 to 600° C., and d) the product fractions are recovered.

This process can be carried out in batch operation or in a continuous manner where the molten plastic is continuously fed to a reactor comprising the catalyst composition or vice versa.

The skilled person is aware of suitable apparatus and equipment for carrying out the process in accordance with the present invention and will select the suitable system based on his professional experience, so that no extensive details need to be given here. However, without willing to be bound to theory, some examples of reactor technologies that can be effectively used to carry out the invention comprise the stirred reactor, the rotary kiln, the bubbling fluidized bed reactor and the circulating fluidized bed reactor riser or downer. The rotary kiln is a cylindrical vessel, inclined slightly to the horizontal, which is rotated slowly about its axis. The material to be processed is fed into the upper end of the cylinder. As the kiln rotates, material gradually moves down towards the lower end, and may undergo a certain amount of stirring and mixing. In a bubbling fluidized bed reactor a fluid (gas or liquid) is passed through the catalyst particles at high enough velocities to suspend the catalyst and cause it to behave as though it were a fluid. In a circulating fluidized bed, also called transport reactor, the catalyst and the fluid flow co-currently at high speed. Generally a cyclone system is used to separate the fluid, which can undergo downstream processing, from the solid, which is recirculated to the reactor. These reactors can be either upflow for risers, or downflow for downers.

Also, suitable methods for recovering the product fractions are known to the skilled person and need not to be described in greater detail here.

The process comprising the use of the specific catalytic composition described herein before offers a new approach to treat plastics waste. By means of the catalytic de-polymerization reaction, plastic wastes (such as PE, PP, PS) may be converted into fuels and other valuable products. Compared to other plastic waste-to-fuel technologies known in the art (e.g. thermal de-polymerization/cracking), the use of the catalytic composition described above for plastic de-polymerization has several advantages: high RON (research octane number) gasoline fractions and diesel fraction that meet EN590 specifications are obtained, the degree of flexibility in raw material compositions, is very high and more flexibility in product distribution and higher conversion rates (hence higher productivities) are achieved.

In the catalytic plastic de-polymerization, 5 classes of products can be identified: Gases, Gasoline fractions, Kerosene fractions, Diesel fractions and waxes. All of them can be in principle valorized on the market, however, gasoline/diesel and HCO fractions are the most attractive while gases fraction has low added value expected for its combustion energy. Particularly for Gasoline fractions it is fundamental to achieve high RON and MON (motor octane number) number. On the other hand, for diesel fractions, it is important to have a low concentration in poly-aromatics to meet specification set by EN590. Both targets are reached with the present invention.

EXAMPLES

General Description of the Procedure 30 g of plastic (20% Polypropylene, 80% Polyethylene) were loaded inside the reactor and a defined amount of catalyst (approximately 20 g) was stored in a catalyst storage tank. The reactor was closed and heated from room temperature to 200° C. during 20 minutes, while simultaneously purging with a 150 mL/min nitrogen flow. When the internal temperature reached the melting point of the plastic, stirring was started and was slowly increased to 690 rpm. The temperature was held at 200° C. for 25-30 minutes. During this heating process, nitrogen coming out from the reactor was disposed of. Meanwhile, the catalyst storage tank containing the catalyst was purged with nitrogen several times.

After this first pretreatment step, temperature was increased to the reaction temperature of 425° C. at a heating rate of 10° C./min, and the collection of gases and nitrogen in the corresponding gas sampling bag was started. When the internal temperature reached the reaction temperature, the catalyst was introduced into the reactor, and the circulation of the gaseous products was commuted to another pair of glass traps and corresponding gas sampling bag. This was considered as the zero reaction time.

During selected time periods, liquid and gaseous products were collected in a pair of glass traps and their associated gas sampling bag, respectively. At the end of the experiment the reactor was cooled to room temperature. During this cooling step, liquids and gases were also collected.

The reaction products were classified into 3 groups: i) gases, ii) liquid hydrocarbons and iii) residue (waxy compounds, ashes and coke accumulated on the catalyst). Quantification of the gases was done by gas chromatography (GC) using nitrogen as the internal standard, while quantification of liquids and residue was done by weight. Glass traps (along with their corresponding caps) were weighed before and after the collection of liquids, while the reactor vessel was weighed before and after each run.

The simulated distillation (SIM-DIS) GC method was used to determine the different fractions in the liquid samples (according to the selected cuts), the detailed hydrocarbon analysis (DHA) gas chromatography method was used to determine the PIONAU components (P=paraffin, I=isoparaffin, O=Olefins, N=Naphthenes, A=Aromatics) in the gasoline fraction of the last withdrawn sample ($C_5$-$C_{11}$: Boiling point <216.1° C.; what includes $C_5$-$C_6$ in the gas sample and $C_5$-$C_{11}$ in the liquid samples), and two dimensional gas chromatography allowed the determination of saturates, mono-, di- and tri-aromatics in the diesel fraction of the last withdrawn liquid samples ($C_{12}$-$C_{21}$; 216.1<BP<359° C.).

Should the disclosure of any patents, patent applications, and publications which are incorporated herein by reference conflict with the description of the present application to the extent that it may render a term unclear, the present description shall take precedence.

Example 1

20 g of a mixture containing 75 wt % ECAT-DC (an equilibrated FCC catalyst obtained from Equilibrium Catalyst Inc.) and 25 wt % $SiO_2$ was used. The ratio of the acidic groups of ECAT to the acidic groups in the $SiO_2$ exceeded 5:1. Experiments were carried out using a plastic mixture comprising 80 wt % HDPE (High Density Poly-ethylene) and 20 wt % PP as raw materials. Reaction temperature was set to 425° C. Catalyst to plastic weight ratio was equal to 20/30 by wt.

Example 2

Example 1 was repeated except that the mixture ratio of ECAT:$SiO_2$ was 50:50 (% by wt.)

Example 3

Example 1 was repeated except that the mixture ratio of ECAT:$SiO_2$ was 25:75 (% by wt.)

Comparative Example 4

Example 1 was repeated except that only $SiO_2$ was used as catalyst.

Comparative Example 5

Example 1 was repeated except that only ECAT-DC was used as catalyst.

The results of the analysis of the yield is given in Table 2

TABLE 2

Conversion and yield of certain fraction in % as function of reaction time.

| | t (min) | Gas | Gasoline | Kerosene | Diesel | HCO* | Conversion in % |
|---|---|---|---|---|---|---|---|
| Comparative Example 5 | 0 | 0.04 | 0.18 | 0.09 | 0.04 | 0.02 | 0.36 |
| | 1.25 | 1.51 | 19.83 | 13.81 | 7.49 | 3.07 | 45.71 |
| | 3.25 | 2.72 | 31.05 | 22.23 | 12.63 | 5.55 | 74.18 |
| | 5 | 3.30 | 35.31 | 25.16 | 14.04 | 5.96 | 83.77 |
| | 8 | 4.12 | 38.27 | 27.01 | 14.80 | 6.13 | 90.32 |
| Comparative Example 4 | 0 | 0.04 | 0.05 | 0.02 | 0.01 | 0.00 | 0.11 |
| | 25 | 1.37 | 4.24 | 2.75 | 1.17 | 0.27 | 9.80 |
| | 40 | 2.22 | 6.75 | 5.25 | 3.04 | 0.38 | 17.64 |
| | 60 | 3.17 | 9.58 | 8.52 | 6.58 | 0.59 | 28.44 |
| | 90 | 4.66 | 13.62 | 14.20 | 14.36 | 1.51 | 48.35 |
| Example 3 | 0 | 0.04 | 0.13 | 0.03 | 0.01 | 0.00 | 0.21 |
| | 5 | 1.09 | 7.16 | 5.00 | 2.52 | 1.04 | 16.82 |
| | 10 | 2.09 | 15.68 | 12.42 | 7.64 | 3.49 | 41.31 |
| | 17 | 3.34 | 23.64 | 18.78 | 11.73 | 4.41 | 61.90 |
| | 26 | 4.39 | 28.23 | 22.81 | 14.61 | 4.83 | 74.87 |

TABLE 2-continued

Conversion and yield of certain fraction in % as function of reaction time.

|  | t (min) | Yield of given fraction in % | | | | | Conversion in % |
|---|---|---|---|---|---|---|---|
|  |  | Gas | Gasoline | Kerosene | Diesel | HCO* |  |
| Example 2 | 0 | 0.05 | 0.09 | 0.01 | 0.01 | 0.00 | 0.16 |
|  | 2 | 0.98 | 9.27 | 5.74 | 2.83 | 0.76 | 19.59 |
|  | 5 | 1.84 | 18.76 | 12.88 | 7.78 | 2.97 | 44.23 |
|  | 8 | 2.71 | 25.92 | 18.53 | 11.60 | 4.88 | 63.63 |
|  | 17 | 4.79 | 35.61 | 26.05 | 16.31 | 6.98 | 89.74 |
| Example 1 | 0 | 0.05 | 0.14 | 0.05 | 0.02 | 0.00 | 0.25 |
|  | 2 | 1.44 | 13.18 | 9.65 | 5.05 | 1.57 | 30.88 |
|  | 4 | 1.95 | 20.51 | 15.77 | 9.09 | 3.23 | 50.55 |
|  | 6.5 | 2.81 | 27.12 | 20.96 | 12.48 | 4.54 | 67.92 |
|  | 14 | 4.77 | 35.78 | 26.87 | 16.07 | 5.76 | 89.25 |

*Heavy cycle oil

TABLE 3

Additional information on quality of the fractions obtained and listed in Table 2.

| Fraction | Ex. 1 | Ex. 2 | Ex. 3 | Comp. Ex. 4 | Comp. Ex. 5 |
|---|---|---|---|---|---|
| Gasoline |  |  |  |  |  |
| RON | 77 | 77 | 77 | 71 | 77 |
| MON | 74 | 74 | 74 | 68 | 75 |
| Diesel |  |  |  |  |  |
| Saturated (wt %) | 70.1 | 78.9 | 84.8 | 95.7 | 63.0 |
| MonocyclicAromatic (wt %) | 18.1 | 13.3 | 9.9 | 3.2 | 21.4 |
| Dicyclic Aromatic (wt %) | 11.2 | 7.4 | 5.1 | 1.0 | 14.9 |
| Tricyclic Aromatic (wt %) | 0.6 | 0.4 | 0.2 | 0.1 | 0.8 |
| Polycyclic Aromatic (wt %) | 11.8 | 7.8 | 5.3 | 1.1 | 15.6 |

The data in Table 2 show that Comparative Example 4 (SiO$_2$) yields high amounts of diesel but only low amounts of gasoline. ECAT when used without second component yields a high amount of gasoline but only lower yield of diesel.

Furthermore, the diesel fraction obtained in Comparative Example 5 contained polycyclic aromatics in an amount exceeding the upper limit of 8% set forth in EN 590 for diesel (Table 3), i.e. the diesel fraction could not be directly used without further purification. The diesel fraction obtained in Comparative Examples 4 fulfilled the EN 590 specification, but, as can be seen from Table 2, the cumulative conversion as function of reaction time was entirely unsatisfactory.

It is apparent from Table 2 that ECAT used alone has good conversion over time but that adding up to 50% of SiO$_2$ does not deteriorate the performance too much. In Comparative Example 4, however, the conversion achieved over time is not feasible for an economical commercial operation.

Furthermore RON (research octane number) and MON (motor octane number) for the gasoline fraction in Comparative Example 4 (71 and 68 respectively) was appr. 10% lower than for Examples 2 to 3 (77 and 74 in each case).

These results show that only the composition comprising components A and B as described in the present invention lead to good conversion, gasoline fraction with high octane number and diesel fraction with polyaromatics content below the limit set forth in EN 590.

Comparative Example 6

Example 1 was repeated except that a bottoms cracking additive BCA-105 purchased from Johnson Matthey was used as catalyst. This product, according to the datasheet had an attrition resistance in accordance with ASTM 757 D of 1.3, a surface area of 130 m$^2$/g, an apparent bulk density of 0.80, and an aluminum oxide content of 68 wt %. The weight ratio Si/Al was 0.452. The average particle size was 90 μm, with 12 wt % of the particles having an average diameter of less than 40 μm and 2 wt % of the particles having a size of less than 20 μm.

TABLE 4

Selectivity towards given fractions obtained.

|  | Selectivity* towards certain fractions in % | | | | |
|---|---|---|---|---|---|
|  | Gas | Gasoline | Kerosene | Diesel | HCO |
| Example 1 | 5.3 | 40.1 | 30.1 | 18.0 | 6.5 |
| Example 2 | 5.3 | 39.7 | 29.0 | 18.2 | 7.8 |
| Example 3 | 5.9 | 37.7 | 30.5 | 19.5 | 6.5 |
| Comparative Example 4 | 9.6 | 28.2 | 29.4 | 29.7 | 3.1 |
| Comparative Example 5 | 4.6 | 42.4 | 29.9 | 16.4 | 6.8 |
| Comparative Example 6 | 9.3 | 32.5 | 23.5 | 20.7 | 14.1 |

*selectivity is yield/conversion

From the results compiled in table 4, one can see that another benefit of using a mixture of ECAT:SiO$_2$ was a lower production of gas fraction, which is a product of no added value in terms of combustion energy. At the same time, high amounts of higher value gasoline, kerosene and diesel were produced. The comparative example 5 was also characterized by a low production of gas fraction; however, as previously observed from the results reported in table 3, the diesel fraction obtained in this comparative example contained polycyclic aromatics in an amount exceeding the upper limit of 8% set forth in EN 590 for diesel.

Only the examples according to the invention gave simultaneously a low gas production and a diesel fraction with polyaromatics content below the limit set forth in EN 590 whilst the conversion as function of reaction time was kept satisfactory.

The invention claimed is:

1. A process comprising catalytic depolymerization of plastics waste using a catalyst composition comprising
   A) a first component containing oxidic compounds comprising aluminum and silicon with a molar ratio of silicon to aluminum of more than 1, and
   B) a second component containing an oxidic compound of silicon;
   wherein the ratio of the number of acidic sites of component A, determined by temperature programmed desorption with ammonia as a base, to the number of acidic sites of component B, determined under the same conditions, is at least 3:1; and wherein the catalyst composition contains at least 50 wt %, based on the combined weight of components A and B, of component B.

2. The process of claim 1 wherein component A comprises supported or unsupported zeolites.

3. The process of claim 1 wherein component A) is a fresh fluid catalytic cracking catalyst, an equilibrium fluid catalytic cracking catalyst or a mixture thereof.

4. The process of claim 1 wherein the plastics waste is selected from the group consisting of post consumer waste plastics, off-spec plastics, and industrial scrap plastic.

5. The process of claim 1 wherein the plastics waste comprises at least 50 wt % of polyolefins, styrene polymers or mixtures thereof.

6. The process of claim 1 wherein the plastics waste is essentially free of thermosetting polymers.

7. The process according to claim 1, wherein the catalyst composition contains at least 55 wt %, based on the combined weight of components A and B, of component B.

8. The process according to claim 7, wherein the catalyst composition contains at greater than 60 wt %, based on the combined weight of components A and B, of component B.

9. A catalytic composition, comprising
    A) a first component containing oxidic compounds comprising aluminum and silicon with a molar ratio of silicon to aluminum of more than 1 and
    B) a second component containing an oxidic compound of silicon,
    wherein the ratio of the number of acidic sites of component A, determined by temperature programmed desorption with ammonia as a base, to the number of acidic sites of component B, determined under the same conditions, is at least 3:1, and wherein the catalyst composition contains at least 50 wt %, based on the combined weight of components A and B, of component B.

10. The catalytic composition in accordance with claim 9 wherein component A) comprises supported or unsupported zeolites.

11. The catalytic composition in accordance with claim 9 wherein component A) is a fresh fluid catalytic cracking catalyst, an equilibrium fluid catalytic cracking catalyst or a mixture thereof.

12. The catalytic composition in accordance with claim 9 wherein the ratio of the number of acidic sites of component A to the number of acidic sites of component B, determined under the same conditions, is at least 5:1.

13. A process for the catalytic depolymerization of plastic waste, the process comprising
    a) in a first step, introducing plastics waste into a reactor, melting the plastics waste, and thereafter increasing the temperature to a temperature in the range of from 350 to 600° C.,
    b) thereafter adding, to the molten plastics, a catalytic composition comprising as component A) a fluid catalytic cracking (FCC) catalyst and as component B) a compound based on oxidic compounds of silicon, wherein the ratio of the number of acidic sites of component A to the number of acidic sites of component B is at least 3:1, and wherein the catalyst composition contains at least 50 wt %, based on the combined weight of components A and B, of component B,
    c) carrying out the catalytic depolymerization at a temperature of from 350 to 600° C., and
    d) recovering the product fractions formed.

14. The process in accordance with claim 13 wherein component A) is a fresh fluid catalytic cracking catalyst, an equilibrium fluid catalytic cracking catalyst or a mixture thereof.

15. The process of claim 13 wherein the plastic waste comprises at least 50 wt % of polyolefins, styrene polymers or mixtures thereof.

16. The process of claim 13 wherein the plastics waste is selected from the group consisting of post consumer waste plastics, off-spec plastics, and industrial scrap plastic.

* * * * *